United States Patent [19]

Bainbridge et al.

[11] Patent Number: 5,503,903
[45] Date of Patent: Apr. 2, 1996

[54] AUTOMOTIVE HEADLINER PANEL AND METHOD OF MAKING SAME

[75] Inventors: David W. Bainbridge; Mario P. Tocci, both of Littleton, Colo.; Larry M. Bauman, Defiance, Ohio

[73] Assignee: Indiana Acoustical Components, Denver, Colo.

[21] Appl. No.: 122,276

[22] Filed: Sep. 16, 1993

[51] Int. Cl.⁶ .............................. B32B 3/28; E04B 1/82; B29C 63/00

[52] U.S. Cl. .......................... 428/182; 428/252; 428/228; 428/233; 428/248; 428/264; 428/265; 428/268; 428/290; 428/295; 428/537.1; 296/214; 264/241; 264/257; 264/285; 264/286; 156/242

[58] Field of Search ...................... 428/182, 184, 428/113, 212, 252, 228, 233, 248, 264, 265, 268, 289, 290, 295, 537.1, 913; 296/211, 213, 214; 181/284, 290; 264/241, 257, 285, 286, 319, 505, 510; 156/242

[56] References Cited

U.S. PATENT DOCUMENTS

| | | | |
|---|---|---|---|
| 4,150,186 | 4/1979 | Kazama | 296/214 |
| 4,227,356 | 10/1980 | Stern et al. | 428/137 |
| 4,479,992 | 10/1984 | Hësseker et al. | 428/116 |
| 4,886,696 | 12/1989 | Bainbridge | 428/184 |
| 5,057,176 | 10/1991 | Bainbridge | 156/222 |

*Primary Examiner*—Donald J. Loney
*Attorney, Agent, or Firm*—Cornelius P. Quinn

[57] ABSTRACT

A self-supporting headliner panel for lining the interior surface of an automotive roof comprises a front sheet, a back sheet and an intermediate corrugated sheet adhered to the front and back sheets. The front sheet and the back sheet each comprise wood fibers and polypropylene. To form the panel, a laminate of the front sheet, the back sheet and the intermediate corrugated sheet is molded in a heated mold which melts polypropylene fibers in the front and back sheet causing the laminate to conform to the shape of the mold and adhering the three sheets together.

22 Claims, 1 Drawing Sheet

AUTOMOTIVE HEADLINER PANEL AND METHOD OF MAKING SAME

BACKGROUND OF THE INVENTION

This invention relates to headliner panels for lining the interior surface of an automotive roof and more particularly to a self-supporting paper composite headliner panel.

The interior surface of an automobile roof is commonly covered or lined with a material which presents an attractive appearance and also acts as a sound absorber. Molded fiber glass panels and foam liners are examples of such liners. Basically, these products adequately perform the functions for which they were designed. However, they are too expensive to be used in economy vehicles. Economy vehicles require a liner that is not only attractive and sound absorbing, but one which is less costly.

One of the materials designers consider when confronted with the need to produce an inexpensive shaped product such as an automotive headliner is wood fibers. Wood fibers are readily available, inexpensive and can be formed into various shapes by a variety of manufacturing techniques. Hardboard headliners have been manufactured from a wood fiber mat formed from an aqueous slurry. The wood fiber mat is placed in a mold where resins in the wood fiber mat enable the mat to be compressed to a higher density and shaped under heat and pressure. However, this product is too heavy; it is difficult to mold; and it has poor acoustical properties.

Other attempts to produce light, low cost headliners have involved forming the headliners from two paperboard facers with a corrugated paperboard medium sandwiched between the paperboard facers. While inexpensive, these headliners lack adequate sound absorption properties and are difficult to form, without cracking, into the dished shape required for a headliner.

U.S. Pat. Nos. 4,886,696 and 5,057,176, disclose a corrugated paperboard automotive headliner which solves many of the problems associated with the previously discussed headliners. The headliner disclosed in these patents is self-supporting, inexpensive and exhibits surprisingly good sound absorption properties. While the headliner of the '696 and the '176 patents performs very well, the self-supporting, light weight headliner of the present invention is inexpensive and provides another approach to solving the headliner problems associated with economy vehicles.

SUMMARY OF THE INVENTION

The self-supporting, light weight headliner of the present invention comprises a front sheet, a back sheet and a corrugated paperboard medium intermediate and adhesively bonded to the front and back sheets. The front and back sheets are vapor impervious, wood fiber filled polypropylene sheets which are both light in weight and exhibit very high structural strength.

The front and back sheets are formed of wood and polypropylene fibers. These sheets are then combined with the corrugated paperboard medium into a corrugated laminate on a conventional heated corrugating machine by passing the sheets through the heated corrugating machine with the corrugated paperboard medium sandwiched between the two sheets. The polypropylene fibers in the front and back sheets average from 1 to 8 microns in diameter. When larger diameter polypropylene fibers were used, the fibers migrated to the surface of the sheet rather than combining with the wood pulp fibers. The sheets then tended to adhere to the heated corrugating machine and did not process well. In addition, sheets made with the finer diameter polypropylene fibers exhibited higher tensile and load strength than sheets made with larger diameter polypropylene fibers.

The headliner panel is formed from the corrugated laminate by placing the corrugated laminate in a heated mold where it is shaped under heat and pressure. The heat in the molding operation causes the polypropylene fibers in the front and back sheets of the laminate to melt and flow around the wood fibers in the sheets as the laminate conforms to the surface of the mold to form vapor impervious, wood fiber filled polypropylene sheets. The melted polypropylene fibers also adhesively bond the front and back sheets to the corrugated paperboard medium.

The resulting headliner panel is vapor impervious, light weight, strong and dimensionally stable. The headliner panel of the present invention is both self-supporting and lighter than fiber glass and paperboard headliner panels of the prior art. In addition, the use of the polypropylene fibers in the front and back sheets of the laminate from which the headliner is formed improves the molding operation. When molding headliners from prior art paperboard laminates, the laminates sometimes tore as the sheets were conformed to the molding surface. The polypropylene fibers function to improve the elongation of the front and back sheets during the molding step and to prevent the tearing of the sheets as the sheets conform to the mold during the molding step.

DESCRIPTION OF THE PREFERRED EMBODIMENT

Figure 1:
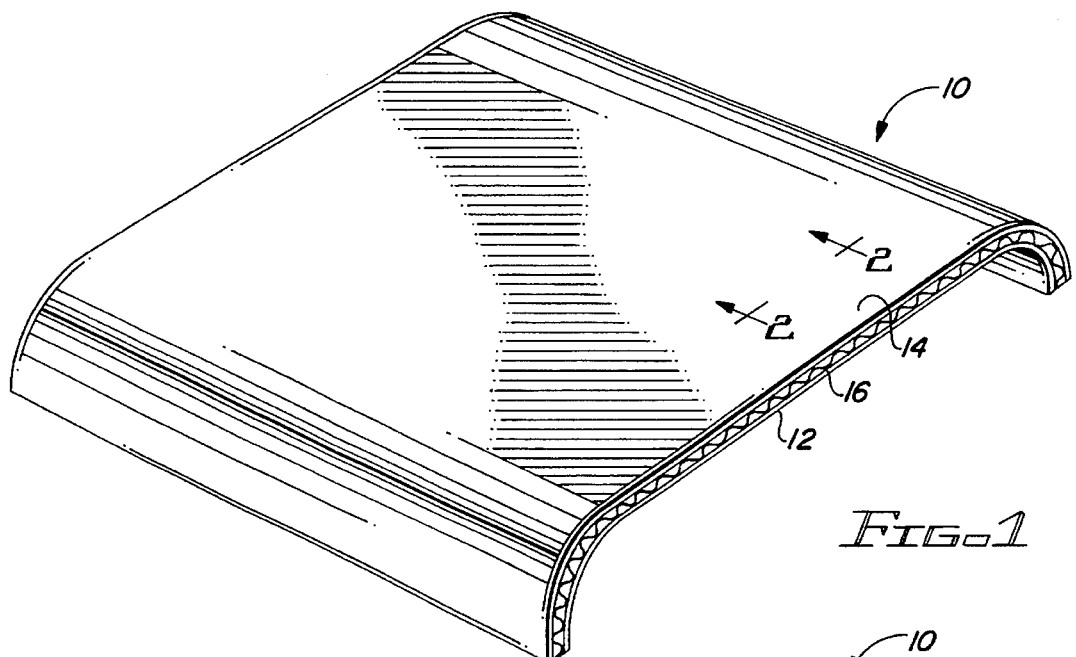
FIG. 1 is a perspective view of an automotive headliner panel of the present invention.

FIG. 1 shows the self-supporting headliner panel 10 of the present invention which comprises a front sheet 12, a back sheet 14 and an intermediate corrugated medium 16. The headliner panel 10 is shaped to conform to the interior surface of an automotive roof with the convex surface of the headliner panel being installed adjacent the interior surface of the roof of the vehicle and the concave surface of the headliner panel being exposed to the interior of the vehicle. The headliner panel may be installed in a vehicle by any of a variety of methods which generally utilize clips or other attachment devices. Since the methods of attaching headliner panels to the roofs of vehicles are well known in the art and form no part of the present invention, the attachment devices are not shown.

Figure 2:
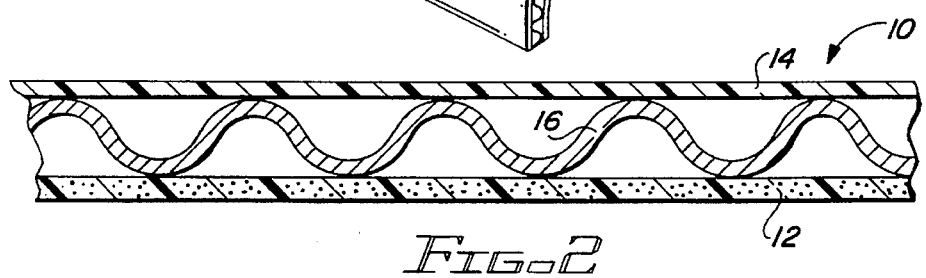
FIG. 2 is an enlarged partial sectional view of the headliner panel of FIG. 1 taken along line 2—2 of FIG, 1.

As best shown in FIG. 2, the self-supporting headliner panel 10 of the present invention is a laminate. The front sheet 12 and the back sheet 14 are each vapor impervious, wood fiber filled polypropylene sheets and the intermediate corrugated medium 16 is preferably formed from paperboard. This laminate not only molds much better than the paper headliner panels of the prior art, it is also substantially lighter. For example, in a weight comparison of standard four door headliner panels, a fiber glass headliner panel weighed 3.92 pounds and a paper headliner panel weighed 3.66 pounds. However, the headliner panel of the present invention weighed only 3.03 pounds. In the automotive industry, where weight savings has become increasingly important, the weight reduction offered by the headliner panel 10 of the present invention is significant.

The caliper of the front sheet 12 and the back sheet 14 is between 18 and 22 points. The preferred composition of the wood fiber filled front sheet 12 and back sheet 14 is about 65% wood fibers and about 35% polypropylene by weight. However, the composition can range from 60% to 75% wood fibers and from 40% to 25% polypropylene by weight.

The back sheet 14 of the headliner panel functions as a vapor barrier for the headliner panel 10 and prevents condensation from the metal vehicle roof from penetrating the headliner. This eliminates the need for a separate vapor barrier in the headliner panel and reduces the cost of the panel. If desired, the front sheet 12 of headliner panel may be given a decorative treatment. For example, the front sheet 12 can be painted or covered with a layer of fabric, fiber glass insulation, or foam-backed fabric. The polypropylene in the front sheet 12 melts during the molding operation and functions as an adhesive to bond the layer of fabric, fiber glass insulation or foam-backed fabric to the sheet.

The corrugated paperboard medium 16 is preferably a C flute which is 141 mils thick and contains 39 flutes per foot. The corrugated paperboard medium 16 should be at least 30 pounds per 1000 square feet of medium and can be up to 40 pounds per 1000 square feet of medium.

The front sheet 12 and the back sheet 14 of the laminate, from which the headliner panel 10 is molded, are each formed from sheets of wood fibers and polypropylene fibers. As discussed above, during the molding process the polypropylene fibers in the sheets 12 and 14 melt to form sheets of wood fiber filled polypropylene in the headliner panel 10.

The preferred wood pulp fiber for the sheets 12 and 14 is a long, bleached or unbleached southern pine which has been found to work better than short or hard wood fibers. The longer fibers function to decrease the density of the sheets 12 and 14 by creating loft. This causes the front sheet 12 and the back sheet 14 to conform more readily to the contour of the mold surface when the laminate is being molded into the headliner panel 10. In addition, the longer length, bleached or unbleached, southern pine fibers improve the tear strength of the front and back sheets due to the greater entanglement of the longer fibers with surrounding fibers. The long southern pine fibers used in the sheets 12 and 14 are between 50 and 150 microns long and have an average diameter of from 20 to 60 microns with a preferred diameter of from 30 to 50 microns.

The polypropylene fibers used in the front sheet 12 and the back sheet 14 are between 50 and 150 microns long and have an average diameter of from 1 to 8 microns with a preferred diameter range of from 1 to 4 microns. Sheets with larger diameter polypropylene fibers, e.g. about 18 to 20 microns, do not work well in the process. When these larger diameter polypropylene fibers were used to form sheets, the fibers migrated to the surface of the sheets during the formation of the sheets. When the front sheet and the back sheet, made with the larger diameter fibers, were run through a heated corrugation machine to form a laminate with the corrugated paperboard medium 16, the sheets did not process well and adhered to the rollers and the double backer hot plates of the heated corrugation machine. Tables 1 and 2 below show the improvement in the tensile and load strength of the sheets 12 and 14 by using fine diameter polypropylene fibers having diameters of 1 to 8 microns as opposed to the larger diameter polypropylene fibers having diameters of about 18 to 20 microns.

TABLE 1

65% WOOD FIBERS/35% POLYPROPYLENE FIBERS
SHEET CALIPER 14 POINT AFTER CALENDERING

|  | 18 to 20 micron polypropylene fibers | 1 to 8 micron polypropylene fibers |
|---|---|---|
| MACHINE DIRECTION | | |
| caliper (inches) | 0.0135 | 0.0103 |
| Tensile (psi) | 1570 | 2771 |
| Load (lbs) | 20.8 | 27.0 |
| Elongation (%) | 3.18 | 2.71 |
| CROSS MACHINE DIRECTION | | |
| caliper (inches) | 0.0145 | 0.0101 |
| Tensile (psi) | 966 | 1563 |
| Load (lbs) | 13.9 | 14.9 |
| Elongation | 5.20 | 3.98 |

TABLE 2

65% WOOD FIBERS/35% POLYPROPYLENE FIBERS
SHEET CALIPER 18 POINT AFTER CALENDERING

|  | 18 to 20 micron polypropylene fibers | 1 to 8 micron polypropylene |
|---|---|---|
| MACHINE DIRECTION fibers | | |
| caliper (inches) | 0.0186 | 0.0130 |
| Tensile (psi) | 1600 | 5051 |
| Load (lbs) | 28.7 | 65.5 |
| Elongation (%) | 3.10 | 3.23 |
| CROSS MACHINE DIRECTION | | |
| caliper (inches) | 0.0176 | 0.0116 |
| Tensile (psi) | 1115 | 2808 |
| Load (lbs) | 19.5 | 31.9 |
| Elongation (%) | 5.57 | 6.19 |

As shown in the tables, the tensile and load strength of the sheets 12 and 14 are both greatly improved when using the finer diameter polypropylene fibers.

Figure 3:
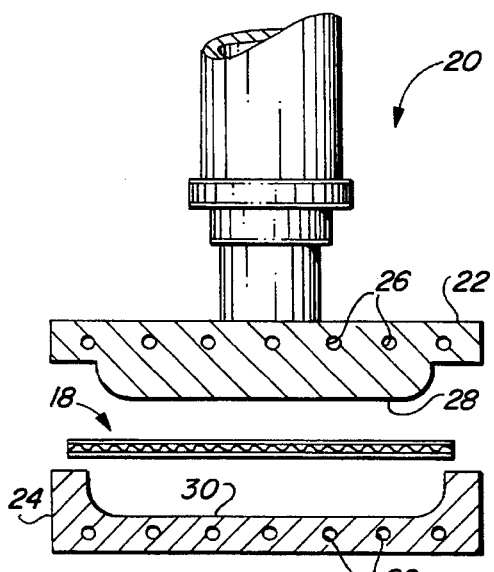
FIG. 3 is a schematic view of a press, used in the method of forming the headliner panel of the present invention, in the open position.
Figure 4:
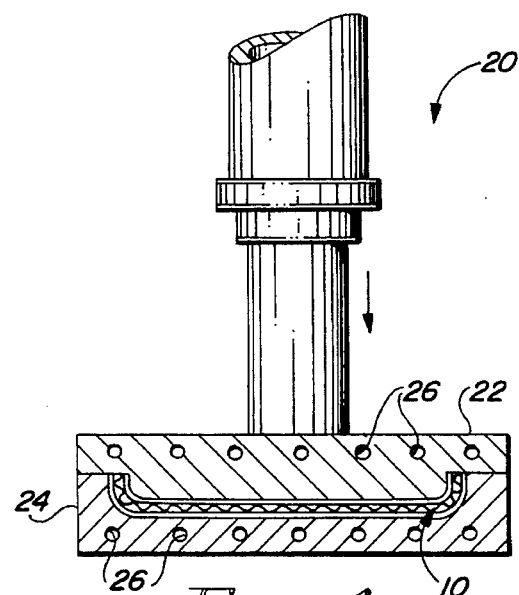
FIG. 4 is a schematic view of the press, used in the method of forming the headliner panel of the present invention, in the closed position.

As shown in FIGS. 3 and 4 the self-supporting headliner panel 10 is formed by locating the laminate 18 comprising front sheet 12, back sheet 14 and the intermediate corrugated paperboard medium 16 in a heated press 20. The heated press comprises a male mold member 22 and a female mold member 24. Both members contain heating units 26, such as electrical heaters or hot water lines, which maintain the male and female press surfaces 28 and 30, respectively, at a predetermined molding temperature of between 350 and 450 degrees Fahrenheit. The curing time in the press for the laminate 18 is between 5 and 15 seconds.

After the laminate 18 is placed in the press, the press is closed by moving the male mold member 22 down into the female mold member 24. The heat and pressure cause the polypropylene fibers in the front sheet 12 and the back sheet 14 to melt and flow around the wood fibers as the sheets conform to the non-planar configurations of the male and female molding surfaces 28 and 30. The polypropylene also acts as an adhesive to bond the corrugated paperboard medium 16 to the front sheet 12 and the back sheet 14. After the molding cycle is completed, the finished self-supporting headliner panel 10 is removed from the press 20.

The composition of the front and back sheets 12 and 14 is very important. Enough polypropylene has to be present in the sheets to maximize moldability of the laminate 18. However, too much polypropylene would cause the laminate to be so thermoplastic that the headliner would be limp when it is removed from the press 20. During the molding process, the polypropylene fibers reach their tack point and flow around the wood pulp fibers as the sheets conform to the contours of the mold surfaces 28 and 30. Once out of the press 20, the polypropylene is no longer in a fiber form but is functioning as a thermoplastic binder with the wood pulp fibers acting as a filler material. If the polypropylene is present in too great a concentration the headliner panel 10 will be limp upon exiting the press. Since dimensional stability is an important property of headliners, a limp headliner panel would not be acceptable. Thus, the maximum percentage by weight of polypropylene should not exceed 40%.

The headliner panels 10 made with the polypropylene and wood fiber sheets of the present invention perform as desired. However, should it ever become necessary to further strengthen the headliner panel, polyester or glass fibers can be added to the composite sheets 12 and 14 to further improve the tear strength of the laminate 18 and sag resistance of the headliner panel 10. If polyester fibers are used in the sheets, the percentage of polyester fibers in the composite will be between 1% and 5% by weight. The polyester fibers will be less than ½ inch in length and have an average fiber diameter of about 6 denier. If glass fibers are used in the sheets, the percentage of glass fibers in the composite will also be between 1% and 5% by weight. The glass fibers will be less than ½ inch in length and have an average fiber diameter of between 1 and 12 microns. The polyester or glass fibers will be substituted for an equal percentage by weight of wood fibers. The use of polyester or glass fibers in the sheets 12 and 14 will increase the cost of the sheets, but under certain circumstances the added cost may be warranted.

What is claimed is:

1. A self-supporting headliner panel for lining the interior surface of a vehicle roof, comprising:

a front sheet adapted to face an interior of a vehicle, a back sheet adapted to face an interior surface of a vehicle roof, and a corrugated sheet intermediate and adhered to the front sheet and the back sheet; the front sheet and the back sheet each comprising wood fiber filled polypropylene sheets; the back sheet being a vapor barrier to prevent condensation from the vehicle roof from penetrating into the headliner; and the polypropylene of the wood fiber filled polypropylene sheets adhering the front sheet and the back sheet to the corrugated sheet.

2. The self-supporting headliner panel of claim 1 wherein: the corrugated sheet is a corrugated paperboard sheet.

3. The self-supporting headliner panel of claim 1 wherein:

the front sheet and the back sheet each comprise about 60% to about 75% wood fibers and about 40% to about 25% polypropylene by weight.

4. The self-supporting headliner panel of claim 1 wherein:

the front sheet and the back sheet each comprise wood fibers, polypropylene and polyester fibers.

5. The self-supporting headliner panel of claim 4 wherein:

the corrugated sheet is a corrugated paperboard sheet.

6. The self-supporting headliner panel of claim 4 wherein:

the front sheet and the back sheet each comprise about 60% to about 65% wood fibers, about 35% polypropylene and about 1% to about 5% polyester fibers by weight.

7. The self-supporting headliner panel of claim 1 wherein:

the front sheet and the back sheet each comprise wood fibers, polypropylene and glass fibers.

8. The self-supporting headliner panel of claim 7 wherein:

the corrugated sheet is a corrugated paperboard sheet.

9. The self-supporting headliner panel of claim 7 wherein:

the front sheet and the back sheet each comprise about 60% to about 65% wood fibers, about 35% polypropylene and about 1% to about 5% glass fibers.

10. A self-supporting headliner panel for lining the interior surface of a vehicle roof, comprising:

a front sheet adapted to face an interior of a vehicle, a back sheet adapted to face an interior surface of a vehicle roof, and a corrugated sheet intermediate and adhered to the front sheet and the back sheet; the front sheet and the back sheet each being wood fiber filled polypropylene sheets and comprising about 65% wood fibers and about 35% polypropylene by weight; the back sheet being a vapor barrier to prevent condensation from the vehicle roof from penetrating into the headliner; the polypropylene of the wood fiber filled polypropylene sheets adhering the front sheet and the back sheet to the corrugated sheet; the front sheet and the back sheet each weighing about 35 pounds per 1000 square feet; and the corrugated sheet being a paperboard sheet weighing about 30 pounds per 1000 square feet.

11. The self-supporting headliner panel of claim 10 wherein:

the front sheet and the back sheet each comprise about 1% to about 5% polyester fibers.

12. The self-supporting headliner panel of claim 10 wherein:

the front sheet and the back sheet each comprise about 1% to about 5% glass fibers.

13. A method of forming a self-supporting panel for lining the interior surface of an automotive roof, comprising the steps of:

providing a front sheet, a back sheet and a corrugated sheet; the front sheet and the back sheet each comprising wood fibers and polypropylene fibers; said wood fibers having an average diameter of between 20 and 60 microns; and said polypropylene fibers having an average diameter of between 1 and 8 microns;

locating the corrugated sheet intermediate the front sheet and the back sheet to form a laminate; and molding the laminate in a heated mold having a nonplaner surface contour at a temperature sufficient to cause the polypropylene fibers to melt and flow around the wood fibers as the laminate conforms to the surface contour of the mold.

14. The method of claim 13 wherein: the front sheet and the back sheet each comprise wood fibers, polypropylene fibers and polyester fibers.

15. The method of claim 13 wherein: the front sheet and the back sheet each comprise wood fibers, polypropylene fibers and glass fibers.

16. The method of claim 13 wherein: the corrugated sheet is a corrugated paperboard sheet.

17. The method of claim 13 wherein: the front sheet and the back sheet each comprise about 60% to about 75% wood fibers and about 40% to about 25% polypropylene fibers by weight.

18. The method of claim 14 wherein: the front sheet and the back sheet each comprise about 60% to about 65% wood fibers, about 35% polypropylene fibers and about 1% to about 5% polyester fibers by weight.

19. The method of claim 15 wherein: the front sheet and the back sheet each comprise about 60% to about 65% wood fibers, about 35% polypropylene fibers and about 1% to about 5% glass fibers.

20. The method of claim 13 wherein: the front sheet and the back sheet each weigh about 35 pounds per 1000 square feet and the corrugated sheet weighs about 30 pounds per 1000 square feet.

21. The method of claim 13 wherein: the wood fibers have an average fiber diameter of between 30 and 50 microns, the polypropylene fibers have an average fiber diameter of between 1 and 4 microns and the wood fibers and the polypropylene fibers range in length from 50 to 150 microns.

22. The method of claim 13 wherein: the wood fibers have an average fiber diameter of between 30 and 50 microns, the polypropylene fibers an average fiber diameter of between 1 and 8 microns and the wood fibers and the polypropylene fibers range in length form 50 to 150 microns.

* * * * *